United States Patent [19]
Carr

[11] Patent Number: 5,362,115
[45] Date of Patent: Nov. 8, 1994

[54] MULTI-RING GASKET

[76] Inventor: Ronald L. Carr, 73968 Debast Rd., Rainier, Oreg. 97048

[21] Appl. No.: 893,653

[22] Filed: Jun. 5, 1992

[51] Int. Cl.⁵ .................................. F16J 15/00
[52] U.S. Cl. ................... 285/363; 285/910; 277/207 A
[58] Field of Search ............ 277/207 A; 285/363, 285/368, 910; 29/463

[56] References Cited

U.S. PATENT DOCUMENTS

| Re. 11,858 | 9/1900 | Merwarth | 285/910 |
|---|---|---|---|
| 925,770 | 6/1909 | Herrick | 285/368 |
| 2,532,891 | 9/1948 | Chupp | 285/130 |
| 2,871,035 | 1/1959 | Kaiser | 285/363 |
| 3,141,686 | 7/1964 | Smith et al. | 285/368 |
| 3,302,953 | 2/1967 | Glasgow | 277/180 |
| 3,387,867 | 6/1968 | Rogers | 285/368 |
| 4,269,417 | 5/1981 | Dutton | 285/363 |
| 4,388,259 | 6/1983 | Jewell et al. | 264/153 |
| 4,516,784 | 5/1985 | Merz | 277/180 |
| 4,756,561 | 7/1988 | Kawata et al. | 285/187 |
| 4,778,189 | 10/1988 | Udagawa | 277/207 A |

FOREIGN PATENT DOCUMENTS

| 0547375 | 8/1942 | United Kingdom | 285/49 |
|---|---|---|---|
| 1061419 | 3/1967 | United Kingdom | 285/363 |

*Primary Examiner*—P. Austin Bradley
*Assistant Examiner*—Jeffrey T. Knapp
*Attorney, Agent, or Firm*—William A. Birdwell & Associates

[57] ABSTRACT

A multi-ring gasket and flanged pipe joint assembly. A gasket for sealing the joint between two flanged pipes of polyvinylchloride, chlorinated polyvinylchloride or fiberglass-reinforced plastic pipe is provided. The gasket has an inner ring, an outer ring and a plurality of spokes connecting the inner ring to the outer ring. Voids, or reduced thickness areas, are formed between the inner ring, the outer ring and the spokes so as to leave substantial space between the flanges at the voids and thereby reduce the uneven distribution of stress on the flanges when the gasket is installed.

37 Claims, 3 Drawing Sheets 5,362,115

1

MULTI-RING GASKET

BACKGROUND OF THE INVENTION

This invention relates to flanged pipe joint assemblies, and particularly to gaskets for sealing the joint between two pipes of a flanged pipe assembly.

In the construction of industrial facilities, such as pulp and paper mills and chemical plants, there is usually a need to employ pipe to convey fluids and fluid-like mixtures throughout the facility. Since these materials are typically reactive, modern practice favors the use of polyvinylchloride ("PVC"), chlorinated polyvinylchloride ("CPVC"), fiberglass-reinforced plastic ("FRP") pipe or other essentially chemically inert pipe.

The pipe used in such facilities includes flanges at the ends of the pipe sections for assembling sections of pipe together at a joint, as is commonly understood in the art. Typically, a gasket is placed between the flanges, and the flanges are forcibly held together by bolts inserted through apertures disposed in the flanges and gasket. When the flanges are forcibly drawn together by bolts disposed therethrough, uneven stress distributions around the flange tend to weaken, and ultimately break, the flanges. While PVC, CPVC and FRP pipe used in such installations have the advantage of durability in the caustic and acidic environments of the reactive materials which flow through the pipes, their flanges are particularly susceptible to breakage due to uneven stress distributions.

Accordingly, there is a need for a flanged, plastic pipe joint assembly which employs a gasket that, when the flanges are forcibly drawn together, minimizes the uneven distribution of stress around the flanges so as to minimize the likelihood of damage thereto.

SUMMARY OF THE INVENTION

The present invention meets the aforementioned need for an improved flanged plastic pipe joint assembly by providing a gasket made of a substantially flat, chemically inert material having an inner ring disposed adjacent the pipe opening in the flange, an outer ring disposed adjacent the outer periphery of the flange and a plurality of spokes joining the inner ring to the outer ring. The flanges are forcibly drawn together by a plurality of bolts disposed around the flanges and in apertures therethrough. A spoke is provided for each of the bolts, the spokes themselves having respective apertures for receiving the bolts. The remainder of the space between the flanges preferably is void; that is, preferably no gasket material exists in that remaining space. However, more than two rings may be used, and a portion of gasket material thinner than the rings and spokes may be disposed in the space between the rings and the spokes.

Accordingly, it is a principle object of the present invention to provide a novel and improved flanged pipe joint assembly and a novel and improved gasket for use in the assembly.

It is another object of the present invention to provide such a gasket that minimizes the uneven distribution of stress around the flanges from the forcible drawing together of the flanges by fasteners.

It is a further object of the present invention to provide such a gasket wherein a portion of the space between two adjoining flanges of respective pipes at the junction thereof is substantially unoccupied by gasket material.

The foregoing and other objects, features, and advantages of the invention will be more readily understood upon consideration of the following detailed description of the invention, taken in conjunction with the accompanying drawings.

DESCRIPTION OF THE PREFERRED EMBODIMENT

Figure 1:
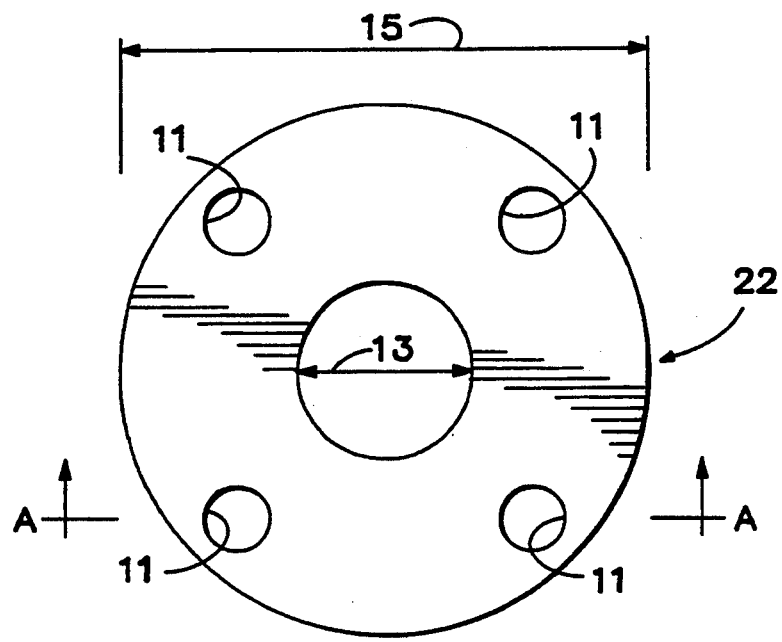
FIG. 1 shows a top view of a conventional flanged pipe joint gasket.

Turning first to FIG. 1, a conventional gasket 22 for a flanged pipe joint assembly typically is annular in shape and has a plurality of apertures 11 for receiving bolts or other fasteners. The inside diameter 13 is substantially equal to the inside diameter of a pipe with which the gasket is to be used, and the outside diameter 15 is substantially equal to the outside diameter of a flange with which the gasket is to be used. Such a gasket may be made of a variety of different materials.

Figure 2:
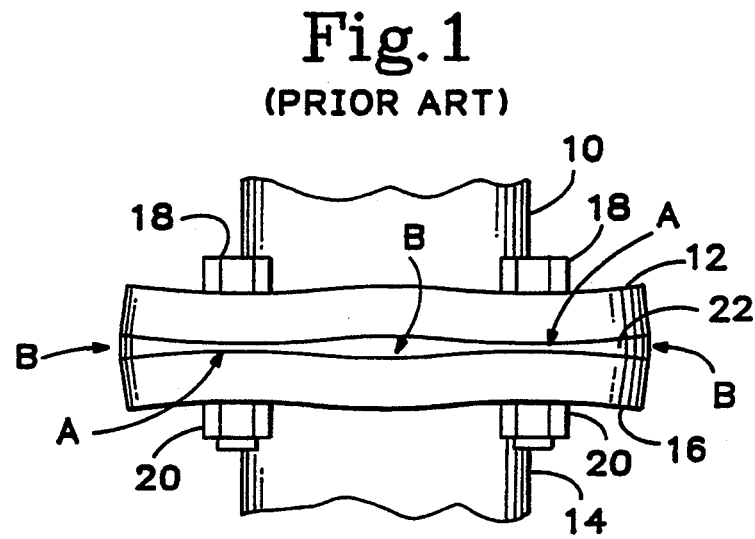
FIG. 2 shows a side view of a flanged pipe joint assembly employing a conventional gasket of the type shown in FIG. 1.

A conventional flanged pipe joint assembly is shown in FIG. 2, wherein a first pipe 10, having a flange 12, is connected to a second pipe 14, having a flange 16, by a plurality of fasteners. The fasteners are typically bolts 18, disposed in circular apertures (not shown) through flanges 12 and 16, and fastened in place by nuts 20, as is commonly understood in the art. A conventional gasket 22, whose apertures 11 correspond to the apertures in the flanges, is disposed between the flanges.

A similar joint assembly is used to connect a flanged pipe to a blind flange, i.e., a flange for closing off the end of a pipe, and to a nozzle, i.e., a flanged outlet from a tank or other container. As used herein, the term "pipe flange", or just "flange", is intended to comprehend blind flanges and nozzle flanges as well as flanges on the end of a pipe.

As can be seen in FIG. 2, when the nuts 20 are tightened onto the bolts 18 so as to forcibly draw the flanges 12 and 16 together, the gasket 22 is compressed in the areas directly beneath the bolts at points A, but resists compression at points B, and thereby causes deformation of the flanges. This is particularly so where the rigidity of the pipe flange is similar to the compressibility of the gasket material, as in the use of PVC, CPVC or FRP pipe.

Figure 3:
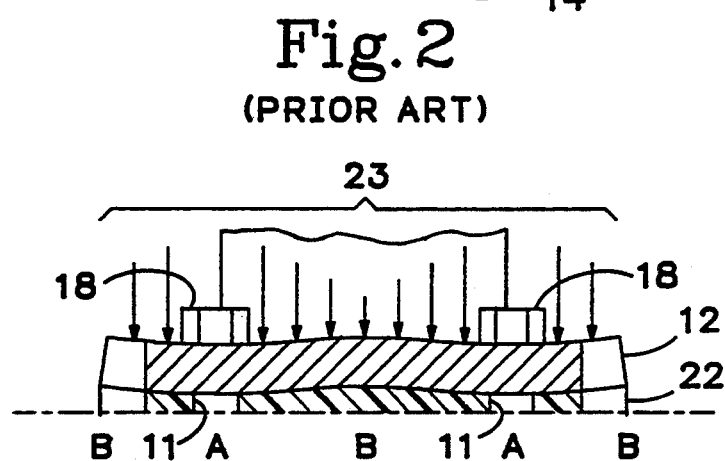
FIG. 3 shows a force diagram for a flanged pipe joint assembly employing a conventional gasket, the force being shown along a line passing through two adjacent bolts of the assembly as shown with respect to a conventional gasket by line A—A in FIG. 1.

This can be seen more clearly in FIG. 3 where one flange 12, made of FRP, and one-half of the conventional gasket 22 is illustrated in a force diagram. The bolts 18 are located at positions A, and the flange is most deformed at positions B. The arrows 23 show a typical distribution of force exerted by the flange 12 on the conventional gasket 22 in a state of equilibrium along a line passing through two adjacent bolts of the assembly. It can be seen that, due to the distribution of forces on the flange 12, shown by the arrows 23, the flange undergoes a bending moment, which can cause the flange to distort and eventually break. Indeed, the flange is substantially distorted at points B.

Figure 4:
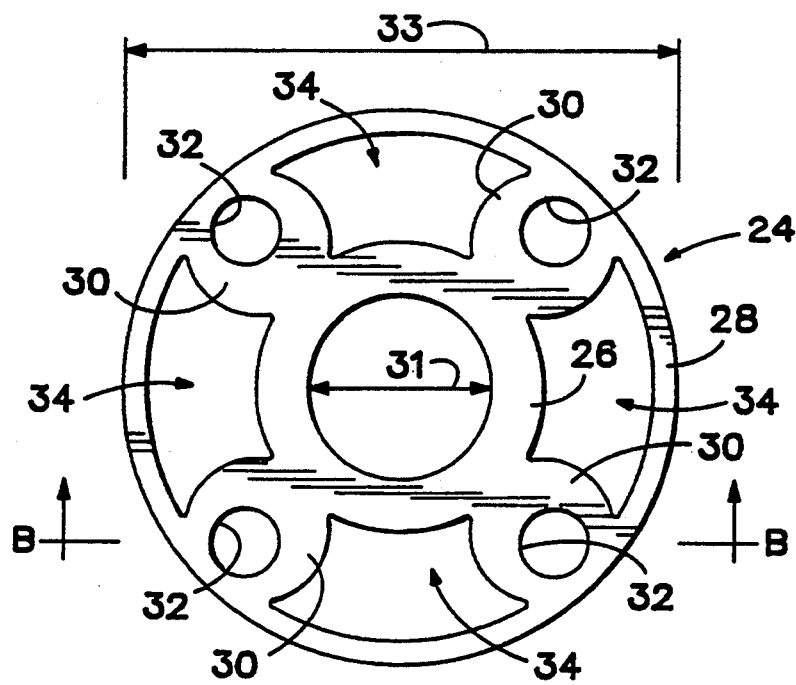
FIG. 4 shows a top view of a gasket according to the present invention.

Turning to FIG. 4, a gasket 24 according to the present invention has an inner ring 26, an outer ring 28 and a plurality of spokes 30 extending between the inner ring and the outer ring. The inner ring comprises a strip of material formed in a substantially-continuous, annular loop whose outer periphery is greater in diameter than the inner diameter of the flanges. That is, it must be greater than the inner diameter of the pipes or the nozzle and pipe connected thereto, or the pipe to which a blind flange is connected. The outer ring comprises a strip of material formed in a substantially-continuous, annular loop whose inner periphery is greater in diameter than the outer periphery of the inner ring but less than the diameter of the outer periphery of the flanges. Ordinarily, the inside diameter 31 of the inner ring 26 is substantially equal to the inside diameter of a pipe with which the gasket is to be used, and the outside diameter 33 of the outer ring 28 is substantially equal to the diameter of the outer periphery of the flanges.

The spokes have apertures 32 therein for receiving bolts, and the spaces 34 between the inner ring, outer ring and spokes preferably are void. For example, about 40 percent of the area between the two flanges may be separated by voids in the gasket. However, it is to be recognized that, rather than making that area entirely void, gasket material significantly thinner than that which forms the inner ring, outer ring and spokes could be used without departing from the principles of the present invention. It is also to be recognized that more than two concentric rings may be used without departing from the principles of the invention.

The gasket may be made of a substantially flat, relatively inert, compressible material such as the synthetic polymer marketed under the trademark TEFLON by E.I. DuPont De Nemours and Company. Preferably, it is made of the product marketed by W. L. Gore & Associates under the trademark GORE-TEX GR SHEET. However, it is to be recognized that other gasket material may be used without departing from the principles of the invention.

Figure 5:
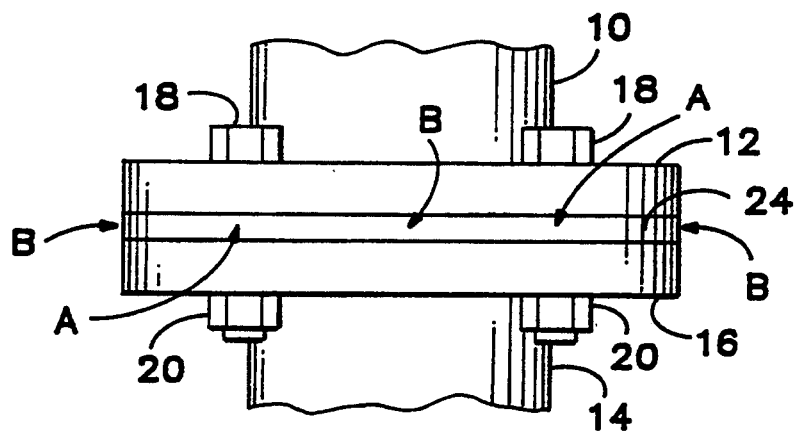
FIG. 5 shows side view of a flanged pipe joint assembly employing a gasket according to the present invention.

When the gasket 24 is placed in a joint assembly, as shown in FIG. 5, those portions of the flanges 12 and 16 which are disposed adjacent the void spaces 34 do not experience any resistance to movement in the direction of one another and do not experience significant bending moments. Rather, the gasket as a whole generally becomes evenly compressed and the flanges 12 and 16 are not distorted.

Figure 6:
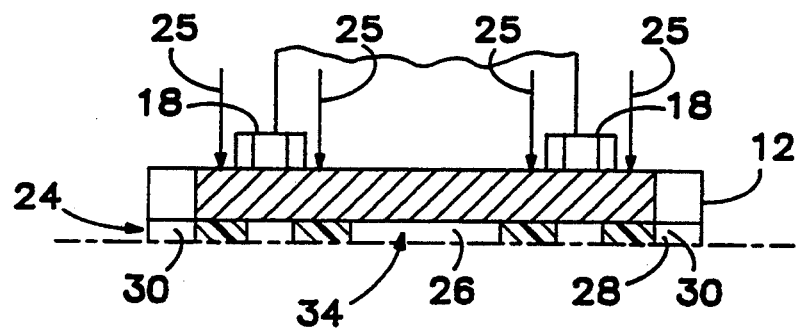
FIG. 6 shows a force diagram for a flanged pipe joint assembly employing a gasket according to the present invention, the force being shown along a line passing through two adjacent bolts of the assembly as shown with respect to a gasket according to the present invention by line B—B in FIG. 4.

Thence, the force diagram for the pipe joint assembly employing a gasket according to the present invention is shown in FIG. 6. Only one flange, made of FRP, and one-half of the gasket 24 are shown. The arrows 25 illustrate the distribution of force exerted by the flange 12 on the gasket 24 of the invention in a state of equilibrium along a line passing through two adjacent bolts of the assembly. As can be seen, there is no significant distortion of the flanges at points B.

In reality, even with the gasket of the present invention, there is likely to be some distortion of the flanges at the periphery thereof. This is due to the presence of the outer ring 28. However, there should be very little distortion in comparison to the use of the conventional gasket shown in FIG. 1. Since the inner ring is located adjacent the openings of pipes 10 and 14, there will be virtually no distortion in that area, as a practical matter. In any event, the bending moments and distortion of the flanges is greatly reduced and the reliability of the joint assembly is thereby greatly enhanced by the use of the gasket according to the present invention.

Figure 7:
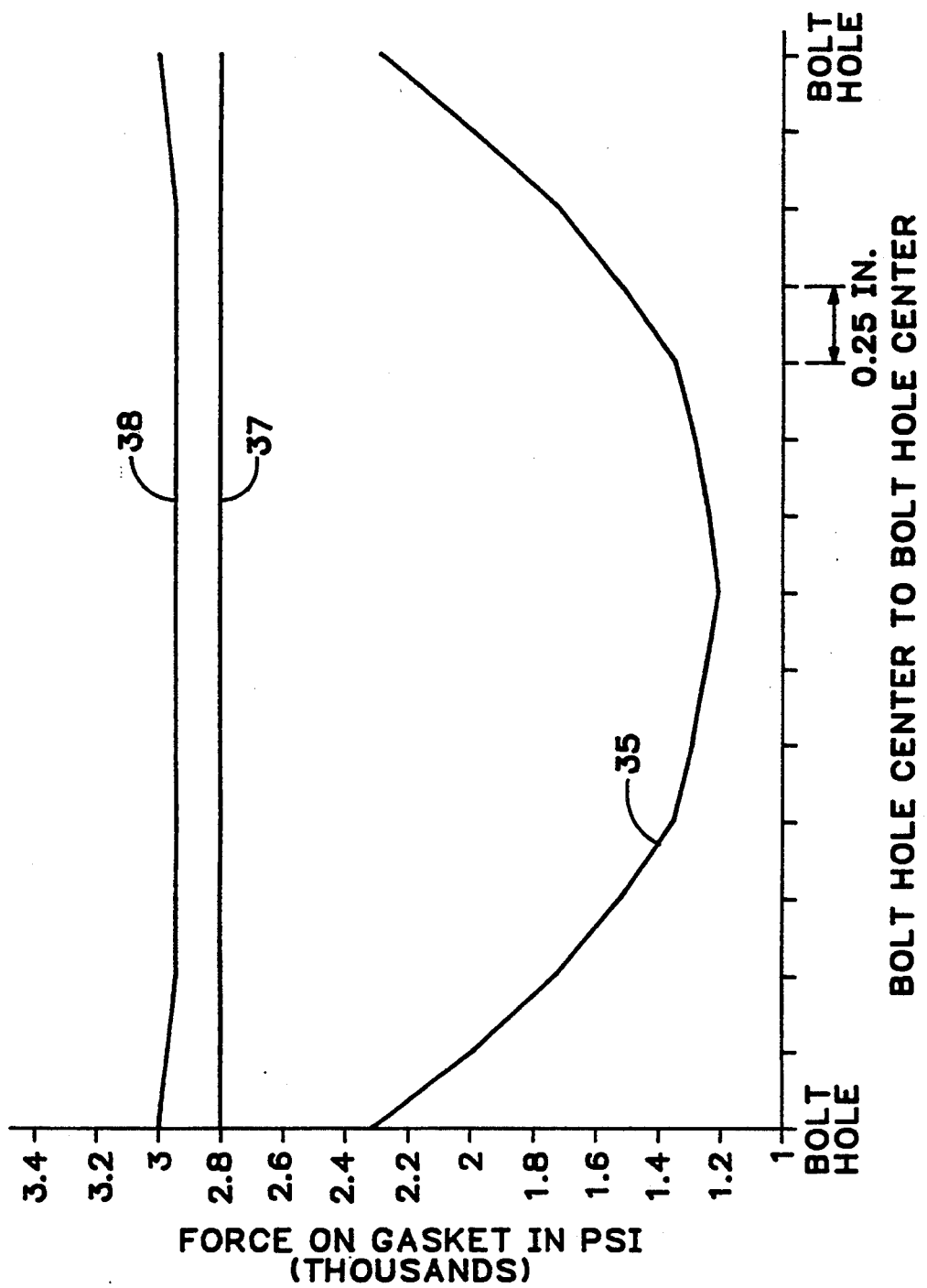
FIG. 7 is a graph of pressure on a conventional gasket, the pressure required to seal a gasket made of a preferred gasket material, and pressure on a gasket according to the present invention, as a function of position between two adjacent bolts.

An advantage of a gasket according to the present invention is that a greater amount of pressure can be applied by the fastening bolts than with the use of a conventional gasket. FIG. 7 shows, at line 35, a graph of the maximum pressure that can ordinarily be applied with a conventional gasket made of GORE-TEX GR SHEET material, as a function of position between two adjacent bolts, the marks along the horizontal axis representing 0.25 inch increments of distance for a 6 inch diameter flange. It can be seen that, while a maximum pressure of about 2300 psi may be applied at the bolts, that results in only about 1300-1500 psi over most of the distance between the bolts.

Line 37 shows the minimum pressure that must be applied to guarantee a seal using GORE-TEX GR SHEET material. This material is highly desirable to use because of its chemically inert property. Yet, that amount of pressure cannot be applied to a gasket of conventional design without damaging the flanges because of the non-uniform distribution of pressure and resulting distortion of the flanges.

Line 38 shows a graph of pressure applied with a gasket according to the present invention. GORE-TEX GR SHEET material allows a pressure in excess of 3000 psi at the bolts, and the gasket of the present invention distributes the pressure more evenly over the portions of the flanges between the bolts and over the rings. In the example shown, the minimum pressure between the bolts is about 2945 psi. As a result, a much more effective seal can be achieved by the gasket of the present invention. In particular, due to the minimal distortion of the flanges, sufficient pressure can be applied to guarantee a seal.

In addition, an important feature of the multi-ring gasket is that if the inner ring ruptures, the outer ring still prevents hazardous material from escaping until the gasket can be replaced.

The terms and expressions which have been employed in the foregoing specification are employed therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A gasket for providing a seal at the joint between a pair of pipe flanges for connecting one flange to the other, said flanges having an inner periphery of known size and shape and an outer periphery of known size and shape, and a plurality of fasteners disposed around said flanges, comprising:
- (a) a first strip of sealing material formed in a substantially-continuous loop having a predetermined shape, said first strip having an outer periphery whose size is greater than the size of the inner periphery of said flanges;
- (b) a second strip of sealing material formed in a substantially-continuous loop having a predetermined shape, said second strip having an inner periphery whose size is greater than said outer periphery of said first strip and less than the size of the outer periphery of said flanges; and
- (c) a plurality of spokes of sealing material, each disposed between and attached to said first strip and said second strip, and extending between said first strip and said second strip, said first strip, said second strip and said spokes having a substantially uniform thickness from a boundary inside said outer periphery of said first strip to a boundary outside said inner periphery of said second strip.

2. The gasket of claim 1, wherein said plurality of spokes extend between said first strip and said second strip at the respective locations of said fasteners.

3. The gasket of claim 2, wherein said first strip and said second strip are both substantially annular in shape.

4. The gasket of claim 2, wherein said fasteners comprise elongate members placed through respective apertures in said flanges and means attached to said elongate members for forcibly drawing said flanges toward one another, said spokes having respective apertures therein for receiving said elongate members.

5. The gasket of claim 4, wherein said fasteners comprise bolts.

6. A gasket for providing a seal at the joint between a pair of pipe flanges for connecting one flange to the other, said flanges having an inner periphery of known size and shape and an outer periphery of known size and shape, and a plurality of fasteners disposed around said flanges, comprising:
- (a) a first strip of sealing material formed in a substantially-continuous loop having a predetermined shape, said first strip having an outer periphery whose size is greater than the size of the inner periphery of said flanges;
- (b) a second strip of sealing material formed in a substantially-continuous loop having a predetermined shape, said second strip having an inner periphery whose size is greater than said outer periphery of said first strip and less than the size of the outer periphery of said flanges; and
- (c) a plurality of spokes of sealing material, each disposed between and attached to said first strip and said second strip, and extending between said first strip and said second strip, said first strip, said second strip and said spokes comprising a single, substantially-flat, piece of material.

7. A gasket for providing a seal at the joint between a pair of pipe flanges for connecting one flange to the other, said flanges having an inner periphery of known size and an outer periphery of known size and shape, and a plurality of fasteners disposed around said flanges, comprising:
- (a) a first strip of sealing material formed in a substantially-continuous loop having a predetermined shape, said first strip having an outer periphery whose size is greater than the size of the inner periphery of said flanges;
- (b) a second strip of sealing material formed in a substantially-continuous loop having a predetermined shape, said second strip having an inner periphery whose size is greater than said outer periphery of said first strip and less than the size of the outer periphery of said flanges; and
- (c) a plurality of spokes of sealing material, each disposed between and attached to said first strip and said second strip, and extending between said first strip and said second strip, said first strip, said second strip and said spokes being made of a substantially flat, chemically inert and compressible material.

8. An assembly, comprising:
- (a) a first flange;
- (b) a second flange disposed substantially adjacent and parallel to said first flange, thereby defining a joint between said first flange and said second flange;
- (c) a first strip of sealing material formed in a substantially-continuous loop having a predetermined shape, said first strip having an outer periphery whose size is greater than the inner periphery of said pipe flanges and being disposed between said first flange and said second flange;
- (d) a second strip of sealing material formed in a substantially-continuous loop having a predetermined shape, said second strip having an inner periphery whose size is greater than said outer periphery of said first strap and less than the outer periphery of said flanges and being disposed between said first flange and said second flange;
- (e) a plurality of fasteners disposed around said flanges; and
- (f) a plurality of spokes of sealing material, each disposed between and attached to said first strip and said second strip, and extending between said first strip and said second strip, said first strip, said second strip and said spokes having a substantially uniform thickness between said inner periphery of said flanges and said outer periphery of said flanges.

9. The assembly of claim 8, therein at least one of said flanges is made of polyvinylchloride.

10. The assembly of claim 8, therein said plurality of spokes extend between said first strip and said second strip at the respective locations of said fasteners.

11. The assembly of claim 10, therein at least one of said flanges is made of chlorinated polyvinylchloride.

12. The assembly of claim 10, therein at least one of said flanges is made of fiberglass-reinforced plastic pipe.

13. The assembly of claim 10, therein said sealing material is made of a polymer.

14. A method for assembling a pair of pipe flanges, comprising the steps of:
- (a) placing said flanges adjacent one another in substantially parallel relation;
- (b) placing between said flanges a gasket, said gasket having:
  - (i) a first strip of sealing material formed in a substantially-continuous loop having a predetermined shape, said first strip having an outer periphery whose size is greater than the inner periphery of said flanges;
  - (ii) a second strip of said sealing material formed in a substantially-continuous loop having a predetermined shape, said second strip having an inner periphery whose size is greater than said outer periphery of said first strip and less than the outer periphery of said flanges; and (iii) a plurality of spokes of said sealing material, each disposed between and attached to said first strip and said second strip, and extending between said first strip and said second strip;

(c) placing a plurality of fasteners around said flanges; and (d) forcibly drawing said flanges together, said first strip, said second strip and said spokes comprising a single piece of material.

15. The method of claim 14, therein said fasteners comprise bolts disposed through apertures in said flanges and said spokes of said gasket, and nuts threaded onto said bolts.

16. The method of claim 9, therein at least one of said flanges is made of polyvinylchloride.

17. The method of claim 9, therein at least one of said flanges is made of chlorinated polyvinylchloride.

18. The method of claim 9, therein at least one of said flanges is made of fiberglass-reinforced plastic pipe.

19. The method of claim 14, therein said plurality of fasteners are placed around said flanges at the locations of said spokes.

20. A gasket for providing a seal at the joint between a pair of pipe flanges for connecting one flange to the other, said flanges having an inner periphery of known size and an outer periphery of known size and shape, and a plurality of fasteners disposed around said flanges, comprising:

(a) a first strip of sealing material formed in a substantially-continuous loop having a predetermined shape, said first strip having an outer periphery whose size is greater than the size of the inner periphery of said flanges;

(b) a second strip of said sealing material formed in a substantially-continuous loop having a predetermined shape, said second strip having an inner periphery whose size is greater than said outer periphery of said first strip and less than the size of the outer periphery of said flanges; and (c) a plurality of spokes of said sealing material, each disposed between and attached to said first strip and said second strip, and extending between said first strip and said second strip, said first strip, said second strip and said spokes comprising a single piece of material.

21. The gasket of claim 20, wherein said plurality of spokes extend between said first strip and said second strip at the respective locations of said fasteners.

22. The gasket of claim 20, therein said first strip and said second strip are both substantially annular in shape.

23. The gasket of claim 20, therein said fasteners comprise elongate members placed through respective apertures in said flanges and means attached to said elongate members for forcibly drawing said flanges toward one another, said spokes members.

24. The gasket of claim 23, therein said fasteners comprise bolts.

25. The gasket of claim 20, therein said first strip, said second strip and said spokes comprise a single, substantially-flat, piece of material.

26. The gasket of claim 20, therein said first strip, said second strip and said spokes have a substantially uniform thickness from a boundary inside said outer periphery of said first strip to a boundary outside said inner periphery of said second strip.

27. The gasket of claim 26, therein said first strip, said second strip and said spokes are made of a chemically inert and compressible material.

28. An assembly, comprising:

(a) a first flange;

(b) a second flange disposed substantially adjacent and parallel to said first flange, thereby defining a joint between said first flange and said second flange;

(c) a first strip of sealing material formed in a substantially-continuous loop having a predetermined shape, said first strip having an outer periphery whose size is greater than the inner periphery of said pipe flanges and being disposed between said first flange and said second flange;

(d) a second strip of said sealing material formed in a substantially-continuous loop having a predetermined shape, said second strip having an inner periphery whose size is greater than said outer periphery of said first strip and less than the outer periphery of said flanges and being disposed between said first flange and said second flange;

(e) a plurality of fasteners disposed around said flanges; and (f) a plurality of spokes of said sealing material, each disposed between and attached to said first strip and said second strip, and extending between said first strip and said second strip, said first strip, said second strip and said spokes comprising a single piece of material.

29. The assembly of claim 28, therein said plurality of spokes extends between said first strip and said second strip at the respective locations of said fasteners.

30. The assembly of claim 28, therein at least one of said flanges is made of polyvinylchloride.

31. The assembly of claim 28, therein at least one of said flanges is made of chlorinated polyvinylchloride.

32. The assembly of claim 28, therein at least one of said flanges is made of fiberglass-reinforced plastic pipe.

33. A method for assembling a pair of pipe flanges, comprising the steps of:

(a) placing said flanges adjacent one another in substantially parallel relation;

(b) placing between said flanges a gasket, said gasket having:

(i) a first strip of sealing material formed in a substantially-continuous loop having a predetermined shape, said first strip having an outer periphery whose size is greater than the inner periphery of said flanges;

(ii) a second strip of sealing material formed in a substantially-continuous loop having a predetermined shape, said second strip having an inner periphery whose size is greater than said outer periphery of said first strip and less than the outer periphery of said flanges; and (iii) a plurality of spokes of sealing material, each disposed between and attached to said first strip and said second strip; and extending between said first strip and said second strip, said first strip, said second strip and said spokes having a substantially uniform thickness between said inner periphery of said flange and said outer periphery of said flange;

(c) placing a plurality of fasteners around said flanges; and (d) forcibly drawing said flanges together.

34. The method of claim 33, wherein said plurality of fasteners are placed around said flanges at the respective locations of said spokes.

35. The method of claim 34, therein said fasteners comprise bolts disposed through apertures in said flanges and said spokes of said gasket, and nuts threaded onto said bolts.

36. A gasket for providing a seal at the joint between a pair of pipe flanges for connecting one flange to the other, said flanges having an inner periphery of known size and an outer periphery of known size and shape, and a plurality of fasteners disposed around said flanges, comprising:
(a) a first strip of sealing material formed in a substantially-continuous loop having a predetermined shape, said first strip having an outer periphery whose size is greater than the size of the inner periphery of said flanges;
(b) a second strip of sealing material formed in a substantially-continuous loop having a predetermined shape, said second strip having an inner periphery whose size is greater than said outer periphery of said first strip and less than the size of the outer periphery of said flanges; and
(c) a plurality of spokes of sealing material, each disposed between and attached to said first strip and said second strip, and extending between said first strip and said second strip at the respective locations of said fasteners, said sealing material being resilient and the hardness of said sealing material being less than the hardness of at least one of the flanges, said first strip, said second strip and said spokes comprising a single, substantially-flat, piece of material.

37. A gasket for providing a seal at the joint between a pair of pipe flanges for connecting one flange to the other, said flanges having an inner periphery of known size and an outer periphery of known size and shape, and a plurality of fasteners disposed around said flanges, comprising:
(a) a first strip of sealing material formed in a substantially-continuous loop having a predetermined shape, said first strip having an outer periphery whose size is greater than the size of the inner periphery of said flanges;
(b) a second strip of sealing material formed in a substantially-continuous loop having a predetermined shape, said second strip having an inner periphery whose size is greater than said outer periphery of said first strip and less than the size of the outer periphery of said flanges; and
(c) a plurality of spokes of sealing material, each disposed between and attached to said first strip and said second strip, and extending between said first strip and said second strip, at the respective locations of said fasteners, said sealing material being resilient and the hardness of at least one of the flanges said first strip, said second strip and said spokes having a substantially uniform thickness from a boundary inside said outer periphery of said first strip to a boundary outside said inner periphery of said second strip.

* * * * *